United States Patent [19]

Janssen et al.

[11] Patent Number: 4,533,168
[45] Date of Patent: Aug. 6, 1985

[54] MOTOR CAR WITH FLOW STEPPED TAIL AND AIR-CONDUCTING MEANS

[75] Inventors: Lutz J. Janssen, Munich; Friedl W. Wülfing, Pulheim-Brauweiler, both of Fed. Rep. of Germany

[73] Assignee: Ford Motor Company, Dearborn, Mich.

[21] Appl. No.: 408,955

[22] Filed: Aug. 17, 1982

[30] Foreign Application Priority Data

Aug. 17, 1981 [DE] Fed. Rep. of Germany ....... 3132369

[51] Int. Cl.³ .......................... B62D 35/00; B60J 9/00
[52] U.S. Cl. ..................................... 296/1 S; 296/91; 296/152; D12/181
[58] Field of Search ..................... 296/15, 91, 217, 1 S, 296/152; D12/181, 182, 183

[56] References Cited

U.S. PATENT DOCUMENTS

| | | | |
|---|---|---|---|
| 3,059,562 | 10/1962 | Sturtevant et al. | 296/91 |
| 4,049,309 | 9/1977 | Seal | 296/1 S |
| 4,081,195 | 3/1978 | Gotz | 296/1 S |
| 4,195,874 | 4/1980 | Janssen et al. | 296/1 S |
| 4,323,274 | 4/1982 | Soderberg et al. | 296/1 S |

FOREIGN PATENT DOCUMENTS

| | | | |
|---|---|---|---|
| 2748874 | 5/1979 | Fed. Rep. of Germany | 296/1 S |
| 2912612 | 10/1980 | Fed. Rep. of Germany | 296/1 S |

Primary Examiner—Robert B. Reeves
Assistant Examiner—Dennis H. Pedder
Attorney, Agent, or Firm—Daniel M. Stock; Clifford L. Sadler

[57] ABSTRACT

In a motor car with a flow stepped tail and air-conducting means in the form of a wing-spoiler combination, the flow stepped tail is constructed with an angle of inclination of the tail window which ensures a flow down from the rear edge of the roof and over the tail window free from flow separation and the wing (5) is disposed offset in front of and above the spoiler (6) secured to the tail in such a way that it is located in front of and above the area (18) subject to flow separation. In this connexion the wing (5) has a broad nose rounding (15), is arranged with its convex curvature (16) towards the tail window (3) and is disposed in an optimum position (28) and at an optimum angle of incidence (29). The wing (5) may preferably be connected to the spoiler (6) to form a structural unit by way of arms (7) running upwards and forwards along the frame of the tail window (3).

1 Claim, 5 Drawing Figures

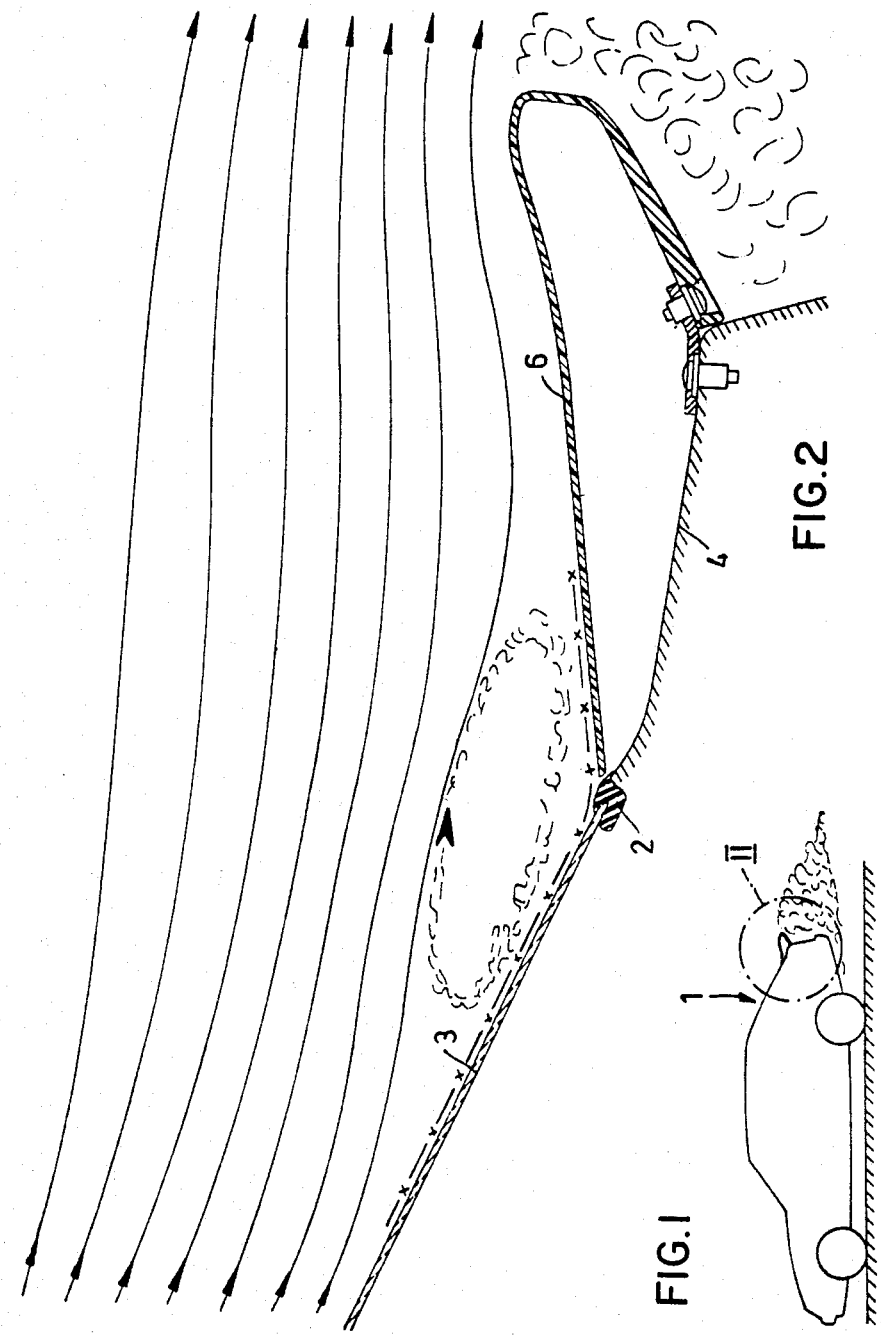

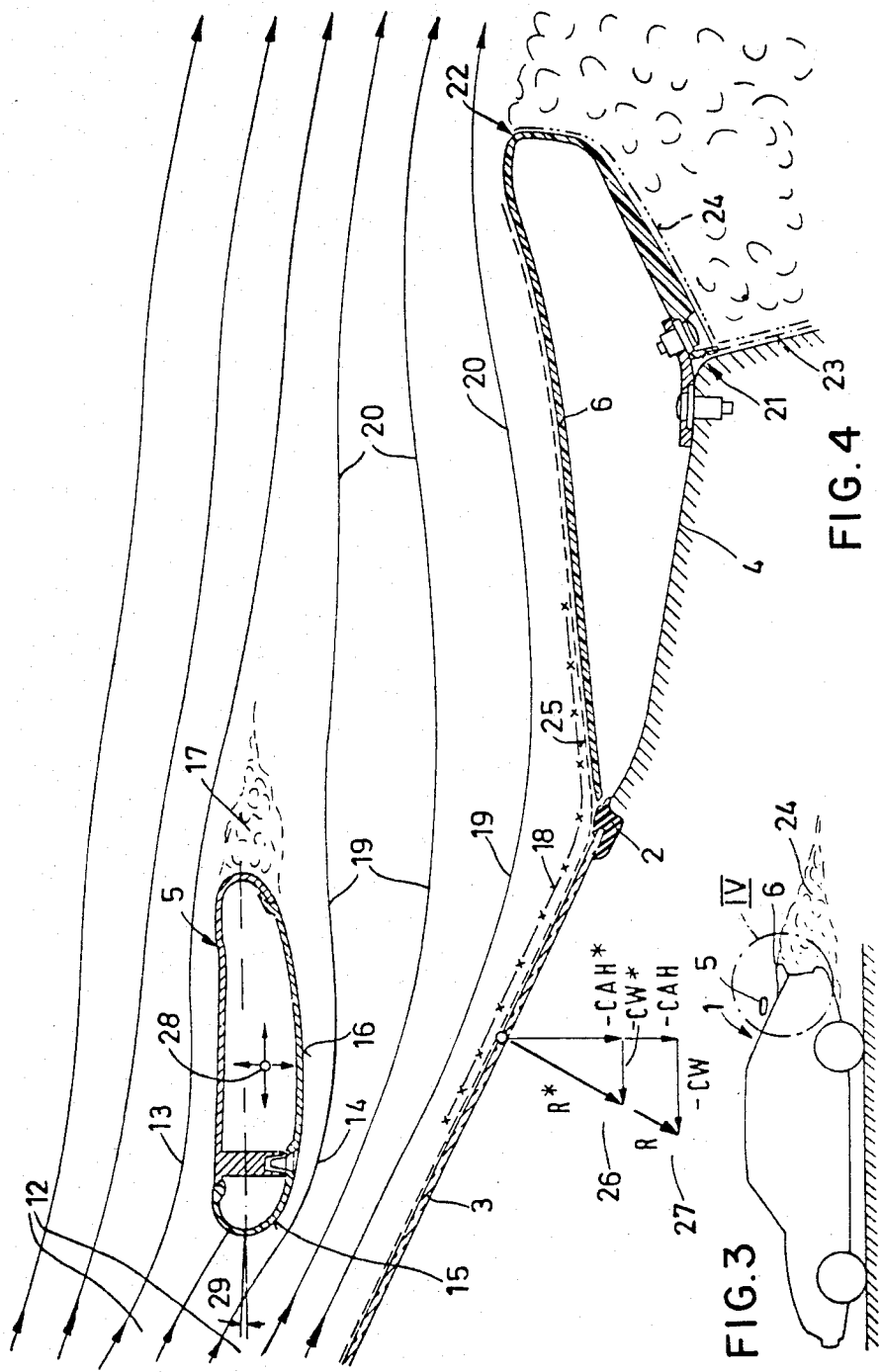

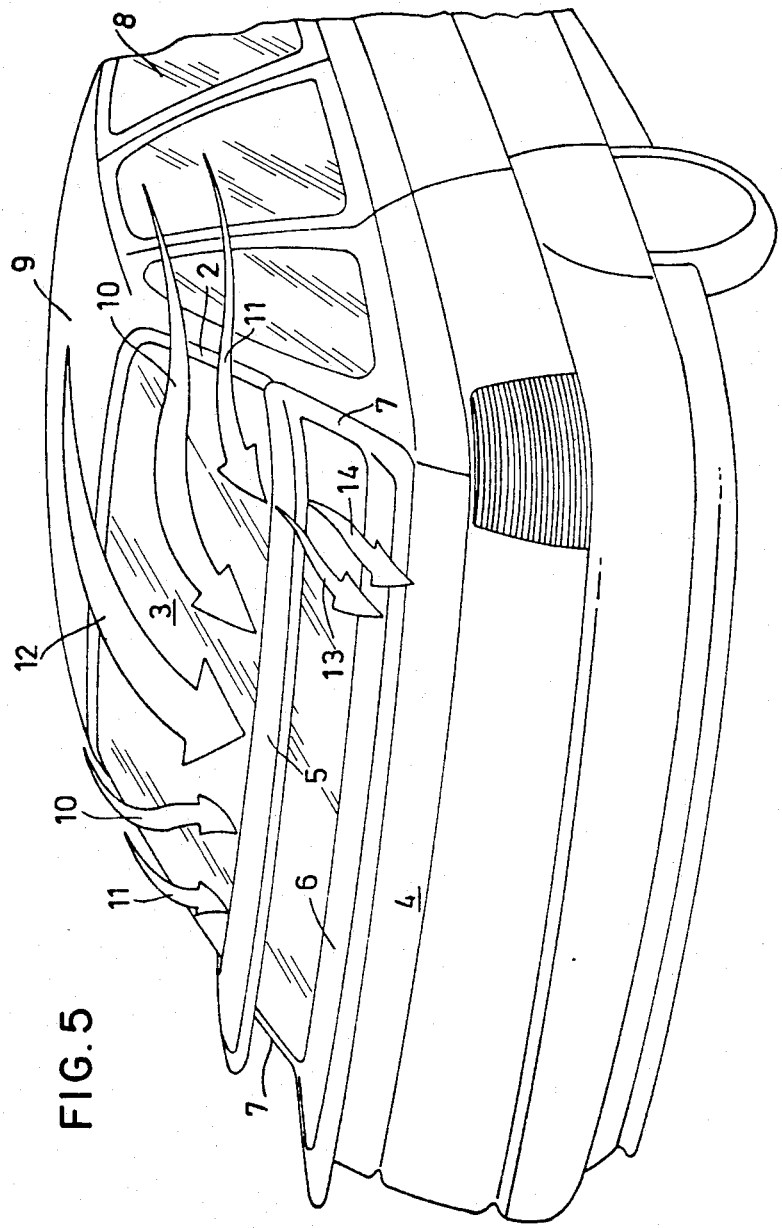

MOTOR CAR WITH FLOW STEPPED TAIL AND AIR-CONDUCTING MEANS

BACKGROUND OF INVENTION

1. Field of Invention

The invention relates to a motor car with a flow stepped tail and air-conducting means in the form of a wing-spoiler combination.

2. Description of the Prior Art

The considerable increases in fuel costs in recent years has led to intensive study of the aerodynamic optimization of new motor car models on the part of the entire motor car industry.

This quest for air resistance frequently produces vehicle shapes which severely restrict the function of areas of the vehicle. Thus, for example, an aerodynamically advantageous flow tail has a high tail termination which restricts the view from the inside of the vehicle towards the rear.

The technical problem is, therefore, on the one hand to have the aerodynamic properties of an advantageous high tail termination and on the other to select a bodywork design which ensures a proper view towards the rear.

One solution to this problem is disclosed in the German Offenlegungsschrift (Laid-Open Specification) No. 27 37 638, which discloses a gently inclined tail window which is bent and continued downwards in the vicinity of the spoiler which freely overlaps it. The improvement of the view towards the rear which is sought in this way may only be achieved, however, if the luggage space normally situated beneath the tail gate is not used to its full height.

Another solution to this problem is disclosed in the German Offenlegungsschrift No. 29 18 234, in which a stepped tail providing for a good view towards the rear and for use of the luggage space is retained. Its aerodynamic disadvantage in the form of a considerable flow separation in the vicinity of the transition from the tail window to the stepped tail is said to be diminished by an aerodynamic aerofoil disposed above the rear edge of the roof. The improvement of the flow over the tail window achieved in this way is gained at the cost of a drawback. Since the aerofoil projects beyond the cross-section of the motor car it increases the cross-sectional profile of the latter and also leads to an increase in lift, which, as described in the publication, must be taken into account.

SUMMARY OF THE INVENTION

The object of the invention is to design a motor car with a flow stepped tail and air-conducting means in such a way that the selected share of the bodywork ensures a proper view towards the rear and a proper use of the luggage space, and, furthermore, also reduces the overall air resistance of the motor car and at the same time produces a desirable downward pressure on the rear axle instead of the undesired lift.

In this connexion the invention is based upon an air-conducting means in the form of a wing-spoiler combination as is known, for example, from the German Gebrauchsmuster (Utility Model) No. 73 35 831, where it is designed on the one hand to the reduce the air resistance and on the other hand, in particular, as a racing car is involved, to considerably increase the downward thrust on the rear axle and therefore to increase the accelerating power of the vehicle. The invention also takes into consideration a spoiler arrangement as disclosed in the German Gebrauchsmuster No. 78 14 079 in which parts of the spoiler are drawn towards the front.

According to the present invention, there is provided a motor car with an aerodynamically efficient tail, the tail being constructed with an angle of inclination of the tail window which ensures the air flow from the rear edge of the roof and the rear edges of the upper parts of the sides of the bodywork onto the over the tail window is substantially free from flow separation and with a spoiler secured to the tail and a wing disposed in front of and above the spoiler in such a way that the wing is also located in front of and above a transition area between the tail window and the end of the spoiler.

By virtue of the fact that the flow stepped tail is constructed with an angle of inclination of the tail window which ensures a flow down from the rear edge of the roof and from the side of the bodywork and over the tail window free from flow separation and that the wing is disposed offset in front of and above the spoiler secured to the tail in such a way that it is located in front of and above, the area subject to flow separation, the flow to the tail spoiler is improved. This improvement is the result of the flow above and the flow beneath the wing produced by the latter and consequently the contour pressure on the tail spoiler which is increased, so that an increased pressure R is produced which results in a negative lift $-CAH+$ =downward pressure and in a negative air resistance $-CW$=propulsion.

By virtue of the fact that the wing has a broad nose rounding and is arranged with its convex curvature downwards towards the tail window and is disposed at an optimum angle of incidence, the desired improvement in the effect of the spoiler is achieved.

By virtue of the fact that the wing is connected to the spoiler to form a structural unit by way of arms which run upwards and forwards along the frame of the tail window, the preservation of the optimally adjusted position of the two aerodynamic components relative to one another is ensured during assembly.

BRIEF DESCRIPTION OF THE DRAWINGS

The invention is described in greater detail with reference to an example of embodiment illustrated in the enclosed drawings, in which FIG. 1 is a diagrammatic side view of a motor car with a flow stepped tail and a spoiler;

FIG. 2 is an enlarged view of the flow conditions in circle II in FIG. 1;

FIG. 3 is a diagrammatic side view of a motor car with a flow stepped tail and a wing-spoiler combination according to the invention;

FIG. 4 is an enlarged view of the flow conditions in area IV in FIG. 3, and

FIG. 5 is an oblique view of a flow stepped tail with a wing-spoiler combination according to the invention.

DESCRIPTION OF THE PREFERRED EMBODIMENT

Only those parts of the motor car which are essential for an understanding of the invention are indicated in the Figures. In this connection a tail gate 1 comprises a window frame 2, a tail window 3 and a lower tailgate area 4. A wing 5 (FIGS. 3 to 5) extends across the tail window 3 and is secured laterally to the window frame 2 in a suitable manner. A spoiler 6 is secured to the lower tailgate area 4 in a conventional manner.

The flow conditions which occurred in the case of the previously customary arrangement of only one tail spoiler are described in connection with FIGS. 1 and 2. A flow separation, whose separation bubble indicated by lines of turbulence reduced the effect of the spoiler 6, occurred in the vicinity of the transition from the tail window 3 to the spoiler 6 in the area marked with dash-X lines.

As is evident from FIG. 5 in particular, according to the invention a wing 5, which extends across the tail window 3 and is preferably connected by arms 7 running upwards and forwards from the spoiler 6 and is secured to the window frame 2, is disposed in front of and above the area subject to flow separation.

In this connection the separation-free flow around the side wall 8 of the bodywork owing to its smooth inwardly rounded configuration best seen in FIG. 5 and the separation-free flow over the roof 9 of the bodywork are indicated by corresponding arrows 10, 11 and 12 in FIG. 5. These flow components 10, 11 and 12 forming the flow over the tail window are divided by the wing 5 into a flow 13 over the wing and a flow 14 under the wing, the behaviour of which is described below in connection with FIGS. 3 and 4.

The wing 5, as is evident from FIGS. 3 and 4, is disposed in front of and above the spoiler 6, has a broad nose rounding or leading edge 15 and is arranged with its convex curvature 16 towards the tail window 3. On account of the aerodynamic profile of the wing 5 only a relatively small eddying area 17 is formed at the rear edge of the said wing 5. As already explained in connexion with FIGS. 1 and 2, without the wing 5 a flow separation, which would impair the effect of the spoiler 6, would be formed in the area 18—indicated by dash-X lines—at the transition from the tail window 3 to the spoiler 6. On account of the wing 5 the flow 19 beneath the wing completely fills the area 18. The flow 20 to the spoiler 6 is likewise undisturbed on account of this.

In order to describe the function of the wing-spoiler combination according to the invention, the action of a spoiler alone will be returned to briefly.

In a vehicle tail without a spoiler the line of flow separation of the tail (beginning of the tail eddying) occurs at the line 21. A comparatively small eddying area 23 is formed. By mounting a spoiler 6 the line of flow separation of the tail is displaced to the line 22 at a higher level. In this way the eddying area 24 on the vehicle tail is increased. If the effect of the tail spoiler is now evaluated only in terms of the tail eddying, owing to the attachment of a spoiler an increased air resistance should also result corresponding to the increased tail eddying.

In actual fact, however, the air resistance of a motor car is reduced by attaching a spoiler 6, because there is an increase in the contour pressure in the area 25 indicated in broken lines as a result of the retarded flow around the tail, and its resulting pressure $R^* = 26$ may be resolved into a negative lift $-CAH^* =$ downward pressure and a negative air resistance $-CW =$ propulsion.

The favourable effect of this change in the contour pressure is greater than the negative effect of the increase in the tail eddying, so that altogether there is a reduction in the air resistance.

The advantage of the wing-spoiler combination over the spoiler 6 alone is the fact that the wing 5 improves the flow to the spoiler 6 and so the contour pressure in the area 25 is greater than without wings 5.

The increased contour pressure 27 is made apparent by the greater resultant R. The force analysis produces both a lower air resistance and a lower rear lift compared with a solution with only the spoiler 6.

The optimum position 28 of the wing 5 and its angle of incidence 29 must, of course, be established by appropriate measurements in a wind tunnel.

We claim:

1. In a motor vehicle of the type having a tail window surface sloping downwardly and rearwardly from the vehicle roof and a rear spoiler positioned proximate the rear terminus of the tail window surface, the rear spoiler presenting an upwardly rearwardly extending upper surface to air flow proceeding downwardly along the tail window surface to define a transition area for the air flow at the juncture of the rear spoiler and the tail window surface wherein air flow is turbulent, a wing assembly having a wing including a rounded leading edge and a convex lower surface extending transversely across the tail window and being positioned above the transition area and longitudinally intermediate the vehicle roof and the transition area, and a pair of side arm members integrally formed with the wing and the rear spoiler to define a unitary assembly, the length of the arms and the angular relationship of the wing to the air flow down the tail window surface being fixed to minimize turbulent flow in the transition area, and to reduce air resistance.

* * * * *